(12) United States Patent  
Long et al.

(10) Patent No.: US 9,404,536 B2  
(45) Date of Patent: Aug. 2, 2016

(54) UNDERWATER SLIDING MEMBER, METHOD FOR MANUFACTURING UNDERWATER SLIDING MEMBER, AND HYDRAULIC MACHINE

(71) Applicant: Kabushiki Kaisha Toshiba, Minato-ku (JP)

(72) Inventors: Than Trong Long, Yokohama (JP); Tadashi Oguma, Yokohama (JP); Yasumi Kizaki, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/173,839

(22) Filed: Feb. 6, 2014

(65) Prior Publication Data

US 2014/0153852 A1 Jun. 5, 2014

Related U.S. Application Data

(63) Continuation of application No. PCT/JP2012/004884, filed on Aug. 1, 2012.

(30) Foreign Application Priority Data

Aug. 8, 2011 (JP) .................. 2011-173132

(51) Int. Cl.
*F16C 33/20* (2006.01)
*B32B 15/08* (2006.01)
(Continued)

(52) U.S. Cl.
CPC ............. *F16C 33/208* (2013.01); *B23K 35/004* (2013.01); *B23K 35/302* (2013.01);
(Continued)

(58) Field of Classification Search
CPC .... F16C 33/208; F16C 33/122; F16C 33/127; F16C 33/14; F16C 33/205; F16C 2208/02; F16C 2204/44; F16C 2204/46; B29C 37/0085; B32B 7/04; B32B 37/00; B32B 15/08; B32B 15/18; B32B 15/015; B32B 27/20; B32B 27/322; B32B 2475/00; B32B 2264/102; B32B 2264/108; B32B 2307/714; Y10T 428/24917; Y10T 428/12493; F05D 2230/40; F05D 2230/31; F05D 2300/171; F05D 2300/432; F05D 2300/514; F05D 2300/603; Y02E 10/226; F05B 2260/95; F03B 11/06; F04D 29/026; F04D 29/046; F04D 29/047; B23K 35/004; C22C 9/00; C22C 38/02; C22C 38/04; C22C 38/44

See application file for complete search history.

(56) References Cited

U.S. PATENT DOCUMENTS 6,416,846 B2 7/2002 Long
8,083,414 B2 * 12/2011 Tsuji et al. .................... 384/276
2014/0037451 A1 2/2014 Oguma et al.

FOREIGN PATENT DOCUMENTS

CN 1031750 A 3/1989
EP 0581185 A1 2/1994
(Continued)

OTHER PUBLICATIONS

Machine Translation of JP 2002-194380 dated Oct. 7, 2002.*

(Continued)

*Primary Examiner* — Alan B Waits
(74) *Attorney, Agent, or Firm* — Oblon, McClelland, Maier & Neustadt, L.L.P

(57) ABSTRACT

An underwater sliding member of the present embodiment is an underwater sliding member used under water, and has: a base material 11 made of a first metal material; an intermediate layer 12 of a porous structure joined to the base material 11 and made of a second metal material; a corrosion inhibiting layer 122 a part of which is melted and filled into a hole of the porous structure of the intermediate layer 12; and a sliding layer 13 formed on the corrosion inhibiting layer 122 and made of a resin material.

6 Claims, 9 Drawing Sheets

(51) Int. Cl.
| | | |
|---|---|---|
| F03B 11/06 | (2006.01) | |
| F04D 29/02 | (2006.01) | |
| F04D 29/046 | (2006.01) | |
| F16C 17/14 | (2006.01) | |
| F16C 33/12 | (2006.01) | |
| F16C 33/14 | (2006.01) | |
| F04D 29/047 | (2006.01) | |
| B32B 15/18 | (2006.01) | |
| B32B 27/20 | (2006.01) | |
| B32B 27/32 | (2006.01) | |
| B23K 35/30 | (2006.01) | |
| B23K 35/00 | (2006.01) | |
| B32B 15/01 | (2006.01) | |
| C22C 9/00 | (2006.01) | |
| C22C 38/02 | (2006.01) | |
| C22C 38/04 | (2006.01) | |
| C22C 38/44 | (2006.01) | |

(52) U.S. Cl.
CPC ............ *B32B15/015* (2013.01); *B32B 15/08* (2013.01); *B32B 15/18* (2013.01); *B32B 27/20* (2013.01); *B32B 27/322* (2013.01); *C22C 9/00* (2013.01); *C22C 38/02* (2013.01); *C22C 38/04* (2013.01); *C22C 38/44* (2013.01); *F03B 11/06* (2013.01); *F04D 29/026* (2013.01); *F04D 29/046* (2013.01); *F04D 29/047* (2013.01); *F16C 17/14* (2013.01); *F16C 33/122* (2013.01); *F16C 33/127* (2013.01); *F16C 33/14* (2013.01); *F16C 33/205* (2013.01); *B32B 2264/102* (2013.01); *B32B 2264/108* (2013.01); *B32B 2307/714* (2013.01); *B32B 2475/00* (2013.01); *F05B 2260/95* (2013.01); *F05D 2230/31* (2013.01); *F05D 2230/40* (2013.01); *F05D 2300/171* (2013.01); *F05D 2300/432* (2013.01); *F05D 2300/514* (2013.01); *F05D 2300/603* (2013.01); *F16C 2204/44* (2013.01); *F16C 2204/46* (2013.01); *F16C 2208/02* (2013.01); *F16C 2208/58* (2013.01); *Y02E 10/226* (2013.01)

(56) References Cited

FOREIGN PATENT DOCUMENTS

| | | |
|---|---|---|
| EP | 0590488 A1 | 4/1994 |
| EP | 0 808 711 A2 | 11/1997 |
| JP | 59-140298 | 8/1984 |
| JP | 10-29256 A | 2/1998 |
| JP | 11-315294 A | 11/1999 |
| JP | 2000-55054 A | 2/2000 |
| JP | 2000-145785 A | 5/2000 |
| JP | 2002-194380 A | 7/2002 |
| JP | 2002-225164 A | 8/2002 |
| JP | 2002-323038 A | 11/2002 |
| JP | 2003-21144 A | 1/2003 |
| JP | 2005-36819 A | 2/2005 |
| JP | 2006-63279 A | 3/2006 |

OTHER PUBLICATIONS

Korean Office Action issued Dec. 9, 2014 in Patent Application No. 10-2014-7002408 (without English Translation).
International Search Report issued on Nov. 13, 2012 for PCT/JP2012/004884 filed on Aug. 1, 2012 with English Translation.
International Written Opinion mailed on Oct. 23, 2012 for PCT/JP2012/004884 filed on Aug. 1, 2012.
International Preliminary Report on Patentability issued Feb. 20, 2014, in International application No. PCT/JP2012/004884 (English translation only).
Combined Chinese Office Action and Search Report issued Jun. 17, 2015 in Patent Application No. 201280038534.2 (with English translation of categories of cited documents).
Extended European Search Report issued May 4, 2015 in European Patent Application No. 12821440.0 (in English).

\* cited by examiner

UNDERWATER SLIDING MEMBER, METHOD FOR MANUFACTURING UNDERWATER SLIDING MEMBER, AND HYDRAULIC MACHINE

CROSS-REFERENCE TO RELATED APPLICATIONS

This application is a continuation of prior International Application No. PCT/JP2012/004884 filed on Aug. 1, 2012, which is based upon and claims the benefit of priority from Japanese Patent Application No. 2011-173132 filed on Aug. 8, 2011; the entire contents of all of which are incorporated herein by reference.

FIELD

Embodiments described herein relate generally to an underwater sliding member, a method for manufacturing the underwater sliding member, and a hydraulic machine.

BACKGROUND

A sliding member of a hydroelectric generator is generally lubricated with oil, but application of a water lubricated bearing is demanded in consideration of environmental concerns of contamination of river by oil spill.

It is disclosed that a sliding member of a water lubricated bearing has a base material made of a metal material, an intermediate layer of a porous structure joined on the base material and made of a metal material, and a sliding layer formed on the intermediate layer and made of a resin material.

In an intermediate layer of a sliding member, a plurality of spherical members made of a metal material is formed on a main surface of a base material to be joined to the main surface, constituting a porous structure. A shape of a hole of the porous structure constituted with the plural spherical members is anisotropic.

When a resin material of a sliding layer is to be filled into the hole, filling corners of the hole is difficult and a part into which the resin material is not filled is sometimes left as a gap in the hole.

In an underwater environment, if the part (gap) into which the resin material is not filled exists in the hole of the porous structure of the intermediate layer, water enters the gap and corrosion occurs from the gap as a starting point (gap corrosion). There is a problem that a mechanical property deteriorates with time due to gap corrosion when a sliding member (bearing member) is used under water for a long time.

DETAILED DESCRIPTION

An underwater sliding member of the present embodiment is an underwater sliding member used under water, and has: a base material made of a first metal material; an intermediate layer of a porous structure joined to the base material and made of a second metal material; a corrosion inhibiting layer a part of which is melted and filled into a hole of the porous structure of the intermediate layer; and a sliding layer formed on the corrosion inhibiting layer and made of a resin material.

First Embodiment

Figure 1:
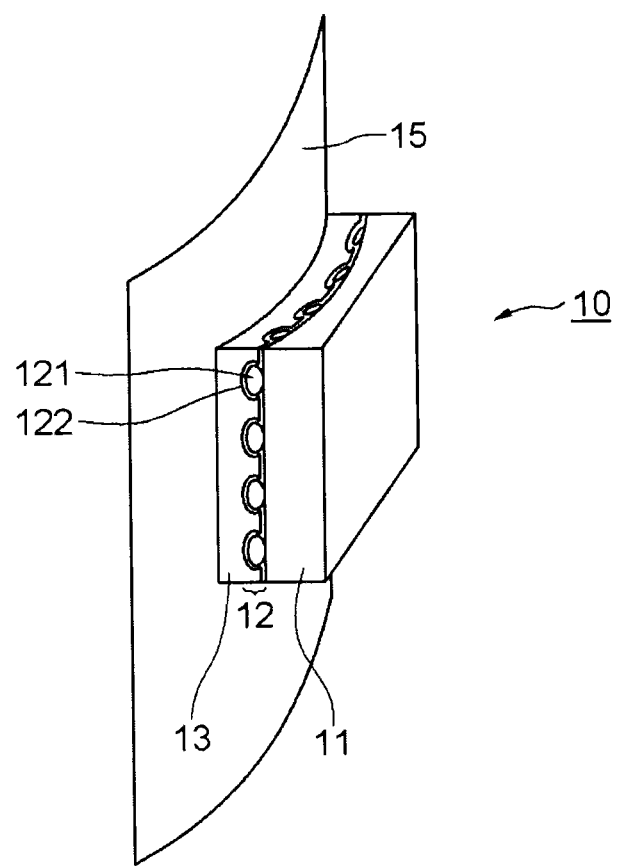
FIG. 1 is an exterior view showing a schematic configuration of an underwater sliding member in a first embodiment.
Figure 2:
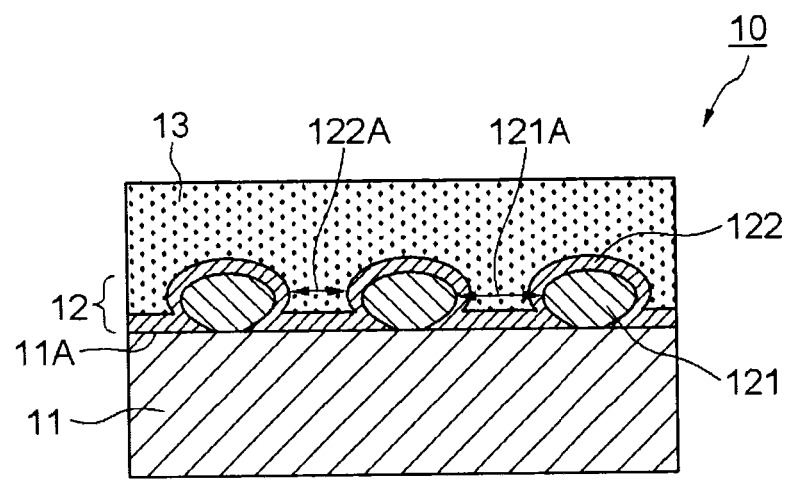
FIG. 2 is a cross-sectional view showing the schematic configuration of the underwater sliding member in the first embodiment.

FIG. 1 is an exterior view showing a schematic configuration of an underwater sliding member in the present embodiment, and FIG. 2 is a cross-sectional view showing the schematic configuration of the underwater sliding member in the present embodiment.

As shown in FIG. 1 and FIG. 2, the underwater sliding member (hereinafter, occasionally abbreviated as "sliding member") 10 of the present embodiment has a base material 11 made of a first metal material, an intermediate layer 12 of a porous structure joined onto the base material 11 and made of a second metal material, a corrosion inhibiting layer 122 (corrosion current interrupting layer) formed at least on the intermediate layer 12 and having an electric insulation, and a sliding layer 13 formed at least on the corrosion inhibiting layer 122 and made of a resin material which contains a filler having a conductivity, a part of the resin material being filled into a hole of the porous structure of the intermediate layer.

The resin material of the sliding layer 13 contains a filler having a conductivity, such as a carbon fiber, in view of mechanical property improvement. Note that in FIG. 1 a member indicated by a reference numeral 15 is a sliding surface of a shaft where the sliding member 10 slides, and thereby the sliding member 10 in the present embodiment functions as a bearing.

The intermediate layer 12 is formed in a manner that a plurality of spherical members 121 made of the second metal material is joined to a main surface 11A of the base material 11 on the main surface 11A. The intermediate layer 12 constitutes the porous structure as a result that the plural spherical members 121 are aligned along the main surface 11A of the base material 11 via a first hole 121A. Note that joint of the plural spherical members 121 to the main surface 11A of the base material 11 can be performed by, for example, a later-described method (brazing bonding method) in which a brazing material is used, or by a solid phase diffusion bonding method. A part or all of the spherical members 121 can be a fibrous member.

As is obvious from FIG. 1 and FIG. 2, in the porous structure constituted with the plural spherical members 121, a shape of the first hole 121A is anisotropic. When the resin material of the sliding layer 13 is to be filled into the first hole 121A, filling corners of the first hole 121A is difficult and a portion into which the resin material is not filled is sometimes left as a gap in the first hole 121A.

The corrosion inhibiting layer 122 covers the main surface 11A of the base material 11 and surfaces of the plural spherical members 121. If the corrosion inhibiting layer 122 is made of a material whose melting point is lower than that of the resin material of the sliding layer 13, the corrosion inhibiting layer 122 enters the part (gap) into which the resin material of the sliding layer 13 is not filled in the first hole 121A and fills the gap.

The sliding layer 13 is formed on the corrosion inhibiting layer 122. The sliding layer 13, a part thereof entering a second hole 122A which is formed after the first hole 121A of the intermediate layer 12 is covered by the corrosion inhibiting layer 122, is filled into the second hole 122A.

In the underwater sliding member of the present embodiment, the corrosion inhibiting layer 122 is formed in a manner to cover the main surface 11A of the base material 11 and the surfaces of the plural spherical members 121. Thus, even if the resin material of the sliding layer 13 contains the filler having a conductivity, such as a carbon fiber, it is possible to interrupt a corrosion current flowing from the shaft 15 to a shaft base material through the sliding member 10 in an underwater environment, enabling prevention of corrosion of the shaft.

Further, if a part (gap) into which the resin material of the sliding layer 13 is not filled exists in the first hole 121A which the intermediate layer 12 being the porous structure has, water enters the gap in the underwater environment. Thus, corrosion occurs from the gap as a starting point (gap corrosion).

However, in the present embodiment, the corrosion inhibiting layer 122 is formed in a manner to cover the main surface 11A of the base material 11 and the surfaces of the plural spherical members 121. Thus, occurrence of a gap in the first hole 121A can be suppressed, and thereby gap corrosion can be also suppressed. Consequently, even in a case where the sliding member 10 (bearing member) is used under water for a long time, deterioration of a mechanical property with time can be suppressed.

As described above, according to the present embodiment, even in the case where the sliding member 10 is used under water for a long time, corrosion of the shaft can be prevented by interrupting the corrosion current flowing from the shaft 15 to the shaft base material through the sliding member 10, and a high mechanical property can be exhibited for a long period.

The base material 11 can be constituted with stainless steel made of iron and chromium, stainless steel made of iron, chromium, and nickel, and stainless steel made of iron, chromium, nickel, molybdenum, manganese, silicon, niobium, and titanium, which are superior in a corrosion resistance and a mechanical property.

The spherical member 121 constituting the intermediate layer 12 can also be constituted with stainless steel made of iron and chromium, stainless steel made of iron, chromium, and nickel, and stainless steel made of iron, chromium, nickel, molybdenum, manganese, silicon, niobium, and titanium, which are superior in a corrosion resistance and a mechanical property, similarly to the base material 11.

The corrosion inhibiting layer 122 can be constituted with any material having an electric insulation. However, due to a manufacturing method described below, it is preferable that the corrosion inhibiting layer 122 is constituted with a fluorocarbon resin with a low melting point, in particular, a perfluoroethylene resin (melting point: 300 to 310°), and a tetrafluoroethylene-hexafluoroethane copolymer (melting point: 260° C.). Note that it is possible to make those resin and copolymer contain a resin-based, ceramics-based, or metal-based filler, for example, a filler of a whisker, a fiber, or a particle shape, as necessary.

The sliding layer 13 can be constituted with a predetermined resin material. For example, it is possible to use a tetrafluoroethylene resin (melting point: 327° C.), a perfluoroethylene-based resin (melting point: 300 to 310° C.), a hexafluoropropylene resin (melting point: 260° C.), a polyetheretherketone resin (melting point: 334° C.), a polyphenylenesulfide resin (melting point: 280° C.), and so on. A fluorine-based resin such as a tetrafluoroethylene resin has a low friction coefficient but has a slightly low mechanical property. On the other hand, the resin such as a polyetheretherketone resin has a high friction coefficient and also has a high mechanical property. Therefore, it is necessary to select a most appropriate material considering a property required of the sliding layer 13, that is, the sliding member 10 properly.

However, when the sliding member 10 is used as a bearing member as shown in the present embodiment, the mechanical property of the sliding member 10 is secured by the base material 11 in some degree. Thus, it is preferable that the sliding layer 13 is principally low in a friction coefficient and excellent in a sliding property. Therefore, the fluorine-based resin, the tetrafluoroethylene resin in particular is preferable among the above-described materials. Note that such resin material is made to contain a filler of a whisker, a fiber, or a particle or the like, in view of mechanical property improvement.

The filler made to be contained in the resin material contains a filler made of a fiber and a particle which contains at least one of carbon and graphite, and further an additional filler made of a whisker, a fiber, and a particle of at least one kind of potassium titanate, aluminum borate, and zinc oxide. Those fillers do not abrade or damage a counterpart member particularly in a case where the sliding counterpart member is made of stainless steel or the like, and can have high abrasion resistances.

Next, a method for manufacturing a sliding member 10 of the present embodiment will be described. FIG. 3 to FIG. 6 are process drawings showing an example of the method for manufacturing the sliding member 10. Note that FIG. 3 to FIG. 6 show states of each process step in the manufacturing process of the sliding member 10, in relation to a cross-sectional view of the sliding member 10 shown in FIG. 2.

Figure 3:
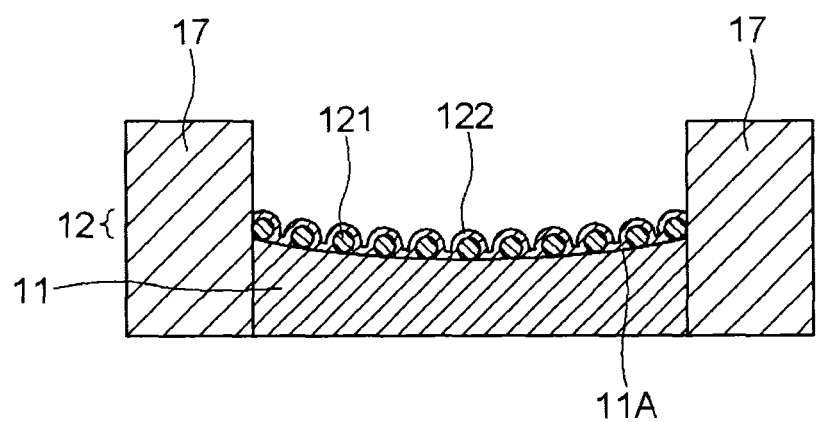
FIG. 3 is a process drawing in a method for manufacturing the underwater sliding member in the first embodiment.

First, as shown in FIG. 3, a mold 17 is prepared, a base material 11 is disposed in the mold 17, and a not-shown brazing material is applied onto a main surface 11A of the base material 11. Next, on the main surface 11A of the base material 11, a plurality of spherical members 121 is disposed at a predetermined pitch, and the base material 11, the spherical members 121, and the brazing material are heated in a reduced pressure atmosphere, to melt the brazing material. Thereafter, by cooling, the plural spherical members 121 are joined onto the main surface 11A of the base material 11 via the brazing material (brazing bonding method). In this way, an intermediate layer 12 of a porous structure is formed.

Note that the intermediate layer 12 of the porous structure can also be formed, instead of by using the brazing material, by directly joining the plural spherical members 121 to the main surface 11A of the base material 11 by a solid phase diffusion bonding method.

Next, a material powder of a fluorocarbon resin or the like is dissolved or dispersed in an organic solvent in advance, to prepare a solution or a dispersion liquid. Then, the solution or the dispersion liquid is applied to the main surface 11A of the base material 11 and surfaces of the plural spherical members 121 by impregnating the base material 11 to which the plural spherical members 121 are joined in the solution or the dispersion liquid, and thereafter, dried. Thereby, the above-described material powder is made to adhere onto the main surface 11A of the base material 11 and the plural spherical members 121. Thereafter, by heating and melt-processing the above-descried power, a corrosion inhibiting layer 122 is formed.

Note that a heat-melt processing of the material powder can be performed simultaneously in a process step of baking in forming a sliding layer 13 which will be described below. In such a case, since a process step of a case of forming the corrosion inhibiting layer 122 is unnecessary to be provided separately, a manufacturing process of the sliding member 10 can be simplified.

Figure 4:
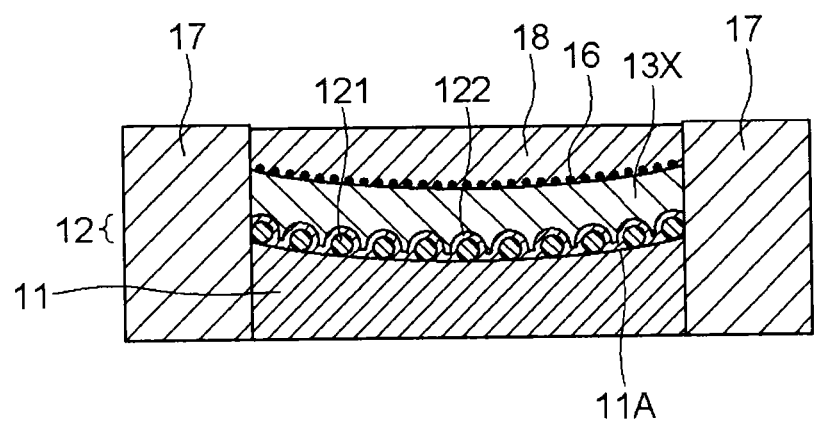
FIG. 4 is a process drawing in the method for manufacturing the underwater sliding member in the first embodiment.

Next, as shown in FIG. 4, a material powder 13X of a tetrafluoroethylene resin or the like being a material powder of the sliding layer 13 is dispersedly disposed on the corrosion inhibiting layer 122 which includes the plural spherical members 121. Then, a nonwoven fabric 16 and a pressure transfer medium 18 are disposed on the dispersedly disposed material powder 13X. Note that the nonwoven fabric 16 and the pressure transfer medium 18 are for improving a mold release property of an upper punch, when compression molding is later performed by using the upper punch. Thus, it is preferable to constitute the pressure transfer medium 18 with a powder of a fluorine-based resin with a low friction coefficient, a tetrafluoroethylene resin, in particular.

Note that in this process step, a part of the material powder 13X is filled into a second hole 122A formed after being covered by the corrosion inhibiting layer 122.

Figure 5:
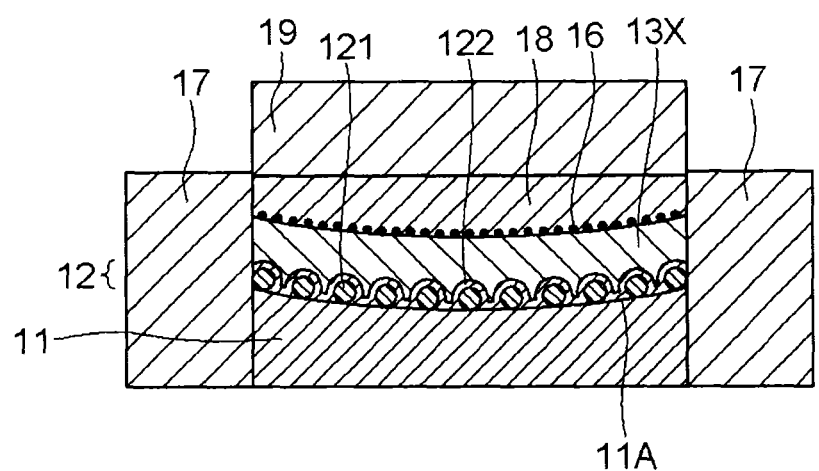
FIG. 5 is a process drawing in the method for manufacturing the underwater sliding member in the first embodiment.

Next, as shown in FIG. 5, via the nonwoven fabric 16 and the pressure transfer medium 18, the material powder 13X is compression molded by using the upper punch 19 and the material powder 13X is heated at a predetermined temperature and baked, to form the sliding layer 13. Note that, as described above, it is possible to form the corrosion inhibiting layer 122 by heat-melt processing a material powder of the corrosion inhibiting layer 122 simultaneously with baking of the material powder X in a process step shown in FIG. 5.

The above-described heating temperature is set at a temperature equal to or lower than 400° C., in a case where the material powder 13X is constituted with the fluorine-based resin with a low melting point such as a tetrafluoroethylene resin. Further, in the process step shown in FIG. 5, it is possible to use a perfluoroethylene resin or the like as described above as the material powder of the corrosion inhibiting layer 122 and to perform heating at a temperature equal to or lower than 400° C. similarly to the above. By the above, simultaneously with baking of the material powder 13X the heat-melt processing can be performed, and an objected corrosion inhibiting layer 122 can be formed.

Note that in this process step, the material powder 13X is filled into the second hole 122A of the porous structure of the intermediate layer 12 sufficiently. On this occasion, even if a gap occurs in the second hole 122A, the corrosion inhibiting layer 122 is formed in advance in a place in which a gap of the first hole 121A occurs as described above, and the gap is buried by the corrosion inhibiting layer 122. Thus, occurrence of a gap to cause gap corrosion can be suppressed.

Figure 6:
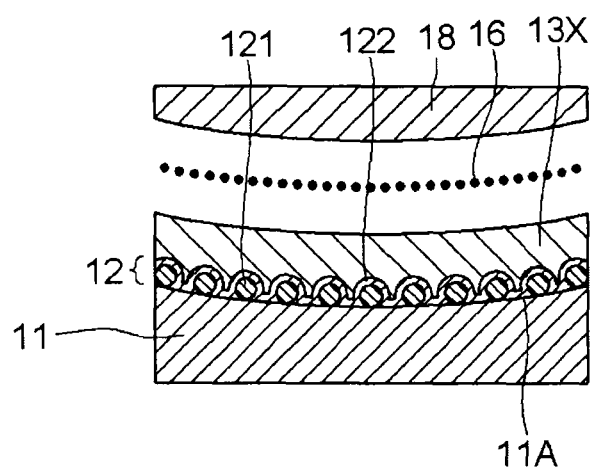
FIG. 6 is a process drawing in the method for manufacturing the underwater sliding member in the first embodiment.

Next, as shown in FIG. 6, after the upper punch 19 is released, the nonwoven fabric 16 and the pressure transfer medium 18 are removed, and thereby the objected sliding member 10 shown in FIG. 1 and FIG. 2 can be obtained.

In the above example, the intermediate layer 12 is formed on the base material 11 in the mold 17, but manufacturing method is not limited thereto. It is possible to form an intermediate layer 12 on a base material 11 out of a mold 17 in advance and thereafter to dispose an assembly which includes the base material 11 and the intermediate layer 12 in the mold 17 at a stage of forming the sliding layer 13 explained in FIG. 4.

Note that the sliding member 10 (bearing member) of the present embodiment can be suitably used as a sliding member (bearing member) in a hydraulic machine such as a hydraulic turbine, a hydraulic turbine generator, and a pump, for example.

Second Embodiment

Figure 7:
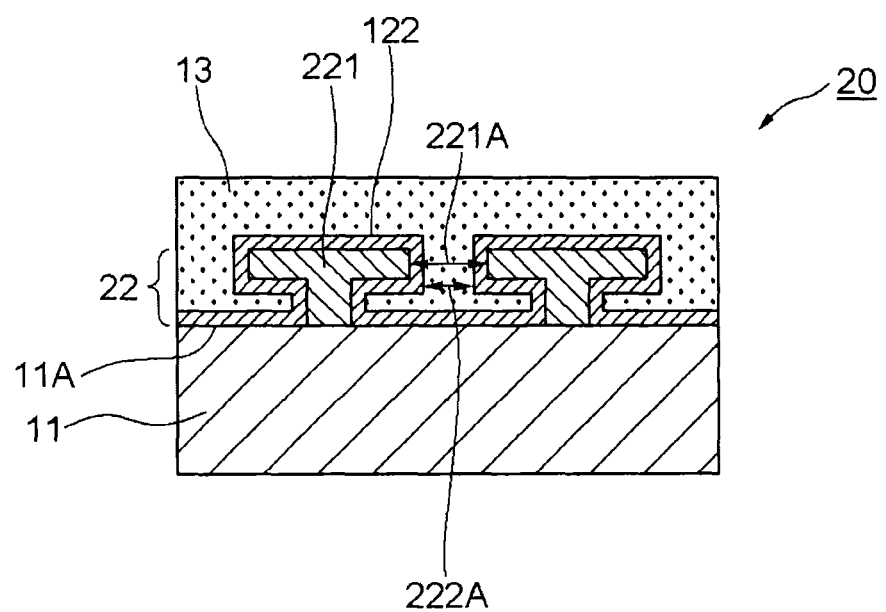
FIG. 7 is a cross-sectional view showing a schematic configuration of an underwater sliding member in a second embodiment.

FIG. 7 is a cross-sectional view showing a schematic configuration of an underwater sliding member in the present embodiment. Note that an exterior view of the underwater sliding member of the present embodiment is similar to a form shown in FIG. 1 in the first embodiment.

As shown in FIG. 7, the underwater sliding member (hereinafter, occasionally abbreviated as "sliding member") 20 of the present embodiment has an intermediate layer 22 of a configuration different from the configuration of the intermediate layer 12 in the first embodiment shown in FIG. 2, but is similar with regard to the other configurations. Thus, explanation will be done centering on a structure of the intermediate layer 22. Note that the same reference numerals are used for components the same as or similar to the components shown in FIG. 1 and FIG. 2.

As shown in FIG. 7, the sliding member 20 of the present embodiment has a base material 11 made of a first metal material, the intermediate layer 22 of a porous structure joined to the base material 11 and made of a second metal material, a corrosion inhibiting layer 122 formed at least on the intermediate layer 22 and having an electric insulation, and a sliding layer 13 formed at least on the corrosion inhibiting layer 122 and made of a resin material which contains a filler having a conductivity, a part of the resin material being filled into a hole in the porous structure of the intermediate layer 22. The resin material contains a filler having a conductivity, such as a carbon fiber, in view of mechanical property improvement. Note that the sliding member 20 in the present embodiment can also be made to function as a bearing similarly to the sliding member 10 in the first embodiment.

The intermediate layer 22 is made of the second metal material and constitutes the porous structure. In the present embodiment, the intermediate layer 22 has a plurality of wedge-shaped members 221 whose cross-sections along a thickness direction are T-shaped, for example, formed on a main surface 11A of the base material 11, and the plural wedge-shaped members 221 are joined to the main surface 11A to constitute the porous structure. The intermediate layer 22 is formed by stacking in a manner that at least a part of punch holes of punching plates are communicated, for example. A corrosion inhibiting layer 122 is formed in a manner to cover the main surface 11A of the base material 11 and surfaces of the plural wedge-shaped members 121.

In the underwater sliding member of the present embodiment, the corrosion inhibiting layer 122 is formed in a manner to cover the main surface 11A of the base material 11 and the surfaces of the plural wedge-shaped members 221. Thus, even in a case where the resin material of the sliding layer 13 contains a filler having a conductivity, such as a carbon fiber, it is possible to interrupt a corrosion current flowing from a shaft 15 to a shaft base material through the sliding member 10 in an underwater environment, enabling prevention of corrosion of the shaft.

Further, if a part (gap) into which the resin material is not filled exists in a first hole 221A which the intermediate layer 22 of the porous structure has, water enters the gap in the underwater environment. Thus, corrosion occurs from the gap as a starting point (gap corrosion).

However, in the present embodiment, the corrosion inhibiting layer 222 is formed in a manner to cover the main surface 11A of the base material 11 and the surfaces of the plural wedge-shaped members 221. Thus, a first gap described above can be suppressed, and thereby gap corrosion is suppressed, and even in a case where the sliding member 20 (bearing member) is used under water for a long time, deterioration of a mechanical property with time can be suppressed.

As described above, according to the present embodiment, even in the case where the sliding member 20 is used under water for a long time, corrosion of the shaft can be prevented by interrupting the corrosion current flowing from the shaft 15 to the shaft base material through the sliding member 20, and a high mechanical property can be exhibited for a long period.

Note that the other features, such as a composing material of the wedge-shaped member 221 of the intermediate layer 22, for example, are the same as that of the spherical member 121 of the sliding member 10 in the first embodiment, and explanation will be omitted.

A method for manufacturing the sliding member 20 of the present embodiment is basically similar to a case shown in FIG. 3 to FIG. 6 except that the porous structure of the intermediate layer 22 is constituted with the plural wedge-shaped member 221 instead of being constituted with the plural spherical members 121.

Note that formation of the plural wedge-shaped members 221 can be performed by preparing a plurality of wedge-shaped members 221 whose cross-sectional shapes are T-shaped in advance and using those instead of the plural spherical members 121. Besides, it is possible to form a plurality of wedge-shaped members 221 by stacking two plate-shaped members in which a plurality of punch holes of different sizes are formed in a manner that the punch holes overlap each other, for example.

Figure 8:
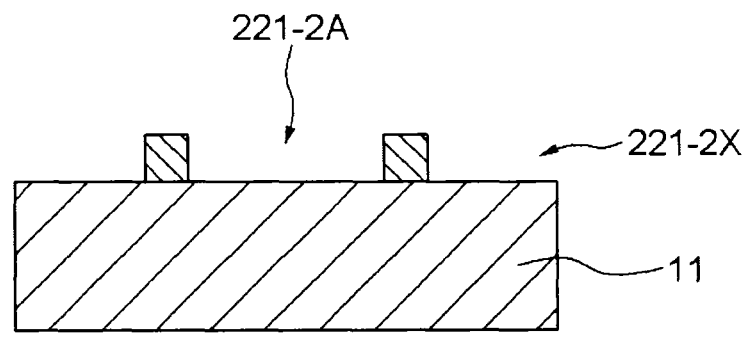
FIG. 8 is a process drawing in a method for manufacturing the underwater sliding member in the second embodiment.
Figure 9:
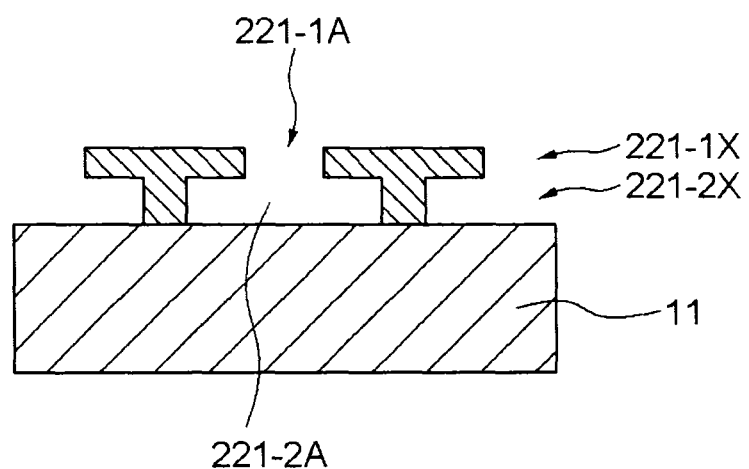
FIG. 9 is a process drawing in the method for manufacturing the underwater sliding member in the second embodiment.

FIG. 8 and FIG. 9 are process drawings showing an example of a case where a plurality of wedge-shaped members 221 are formed by using two plate-shaped members in which punch holes are formed.

As shown in FIG. 8, a lower plate-shaped member 221-2X in which a punch hole 221-2A is formed is joinedly disposed on a main surface 11A of a base plate 11 by brazing or the like. Next, as shown in FIG. 9, an upper plate-shaped member 221-2X in which a punch hole 221-1A is formed is joinedly disposed to the lower plate-shaped member 221-1X by brazing or the like in a manner that the punch hole 221-1A and the punch hole 221-2A match. Consequently, the wedge-shaped members 221 as shown in FIG. 7 can be formed.

Note that process steps for forming a corrosion inhibiting layer 122, a sliding layer 13, and so on are the same as the process steps shown in FIG. 3 to FIG. 6 and explanation will be omitted.

The sliding member 20 (bearing member) of the present embodiment can be suitably used as a sliding member (bearing member) in a hydraulic machine such as a hydraulic turbine, a hydraulic turbine generator, and a pump, for example.

In the first embodiment and the second embodiment described above, the members constituting the porous structures of the intermediate layers 12 and 22 are spherical and wedge-shaped, but shapes of the above-described members are not limited in particular, as long as a necessary condition that the porous structures of the intermediate layers 12 and 22 have an anchoring effect to the sliding layer 13 is fulfilled. For example, the holes of the porous structures of the intermediate layers 12 and 22 are not necessarily required to be penetrated.

EXAMPLES

Example 1

First, an Ag-56 mass % Cu brazing material is applied to a main surface 11A of a base material 11 having a cylindrical shape, the base material 11 being made of SUS 316 stainless steel. Then, a plurality of steel balls 121 of 3 mm in diameter made of SUS 316 stainless steel is dispersed thereon. Thereafter, a heat processing is performed in a vacuum of 1050° C. and $10^{-3}$ Torr, and the plural steel balls 121 are joined to the main surface 11A of the base material 11. In this way, an intermediate layer 12 of a porous structure is formed.

Next, there is repeated a process step of applying a dispersion liquid made by dispersing a resin powder (raw material of a corrosion inhibiting layer 122) of tetrafluoroethylene-hexafluoropropylene copolymer in a solvent to the main surface 11A of the base material 11 and surfaces of the plural steel balls 121 and drying, until a final thickness becomes 0.5 mm. As described above, the above-described resin powder is made to adhere to the main surface 11A of the base material 11 and the surfaces of the plural steel balls 121.

Next, an assembly which includes the base material 11 and the plural steel balls 121 and is constituted with an intermediate layer 12 which includes a corrosion inhibiting layer 122 is disposed in a mold 17. Then, a material powder of a tetrafluoroethylene resin containing a 30 mass % carbon fiber is filled onto the assembly. As the carbon fiber, a short fiber of 7 to 10 μm in diameter and 3 mm in length is used.

Next, an nonwoven fabric 16 of 0.3 mm in thickness and a pressure transfer medium (powder) 18 made of PTFE are disposed on the material powder, and compression molding is done in one direction at a pressure of 50 MPa by a molding punch 19 having a planar shape.

Next, after the nonwoven fabric 16 and the pressure transfer medium 18 are removed, a molded body of the material powder described above is heated at 370° C. for two hours. Thereby, the molded body is heat-melted to form a sliding layer 13, and the resin powder adhering to the main surface 11A of the base material 11 and the surfaces of the plural steel balls 121 is heat-melted, to form the corrosion inhibiting layer 122 on the surfaces.

A flow state of a corrosion current of the sliding member obtained as above is examined and it is confirmed that the corrosion current is interrupted and that gap corrosion does not occur.

According to at least one embodiment described above, even in a case of use in an underwater environment for a long time, deterioration of a mechanical property with time can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An underwater sliding member used under water, comprising:
   a base material made of a first metal material;
   an intermediate layer of a porous structure having spherical members or T-shaped members made of a second metal material, the spherical members or the T-shaped members being joined to a surface of the base material, the spherical members or the T-shaped members being aligned along the surface of the base material forming first holes therebetween;
   a corrosion inhibiting layer a part of which is melted and filled into the first holes, the corrosion inhibiting layer covering the spherical members or the T-shaped members, the corrosion inhibiting layer forming second holes therebetween which are formed after the first holes are covered by the corrosion inhibiting layer; and
   a sliding layer formed on said corrosion inhibiting layer and made of a resin material, a part of the sliding layer being filled into the second holes,
   wherein the corrosion inhibiting layer is made of a material whose melting point is lower than that of the resin material of the sliding layer,
   wherein the first metal material of said base material is at least one of stainless steel made of iron and chromium, stainless steel made of iron, chromium, and nickel, and stainless steel made of iron, chromium, nickel, molybdenum, manganese, silicon, niobium, and titanium,
   wherein the second metal material of said intermediate layer is at least one of stainless steel made of iron and chromium, stainless steel made of iron, chromium, and nickel, and stainless steel made of iron, chromium, nickel, molybdenum, manganese, silicon, niobium, and titanium,
   wherein the resin material constituting said sliding layer contains a tetrafluoroethylene resin,
   wherein said sliding layer contains a filler made of a fiber and a particle which includes at least one of carbon and graphite,
   wherein said sliding layer contains an additional filler made of a whisker, fiber, and a particle, the whisker, the fiber, and the particle being made of at least one of potassium titanate, aluminum borate, and zinc oxide.

2. The underwater sliding member according to claim 1,
   wherein said corrosion inhibiting layer is made of a fluorocarbon resin.

3. A method for manufacturing an underwater sliding member used under water, the method comprising:
   joining an intermediate layer of a porous structure to a base material made of a first metal material, the intermediate layer having spherical members or T-shaped members made of a second metal material, the spherical members or the T-shaped members being joined to a surface of the base material, the spherical members or the T-shaped members being aligned along the surface of the base material forming first holes therebetween;
   forming a corrosion inhibiting layer a part which is melted and filled into the first holes, the corrosion inhibiting layer covering the spherical members or the T-shaped members, the corrosion inhibiting layer forming second holes therebetween which are formed after the first holes are covered by the corrosion inhibiting layer; and
   forming a sliding layer made of a resin material on the corrosion inhibiting layer, a part of the sliding layer being filled into the second holes,
   wherein the corrosion inhibiting layer is made of a material whose melting point is lower than that of the resin material of the sliding layer,
   wherein the first metal material of said base material is at least one of stainless steel made of iron and chromium, stainless steel made of iron, chromium, and nickel, and stainless steel made of iron, chromium, nickel, molybdenum, manganese, silicon, niobium, and titanium,
   wherein the second metal material of said intermediate layer is at least one of stainless steel made of iron and chromium, stainless steel made of iron, chromium, and nickel, and stainless steel made of iron, chromium, nickel, molybdenum, manganese, silicon, niobium, and titanium,
   wherein the resin material constituting said sliding layer contains a tetrafluoroethylene resin,
   wherein said sliding layer contains a filler made of a fiber and a particle which includes at least one of carbon and graphite,
   wherein said sliding layer contains an additional filler made of a whisker, fiber, and a particle, the whisker, the fiber, and the particle being made of at least one of potassium titanate, aluminum borate, and zinc oxide,
   wherein joint of the spherical members or the T-shaped members to the surface of the base material is performed by a brazing bonding method or by a solid phase diffusion bonding method.

4. The method for manufacturing the underwater sliding member according to claim 3,
   wherein the corrosion inhibiting layer is formed while being impregnated with a mixed powder of a material powder dispersed at least on the intermediate layer in advance, and thereafter heated and melt-processed.

5. The method for manufacturing the underwater sliding member according to claim 3,
   wherein the sliding layer is formed by dispersedly disposing a powder of the resin material on the corrosion inhibiting layer and thereafter performing compression-molding and baking.

6. An underwater bearing member comprising:
   a shaft having a sliding surface; and
   an underwater sliding member for sliding on the sliding surface of the shaft, the underwater sliding member including:
   a base material made of a first metal material;
   an intermediate layer of a porous structure having spherical members or T-shaped members made of a second metal material, the spherical members or the T-shaped members being joined to a surface of the base material, the spherical members or the T-shaped members being aligned along the surface of the base material forming first holes therebetween;
   a corrosion inhibiting layer a part of which is melted and filled into the first holes, the corrosion inhibiting layer covering the spherical members or the T-shaped members, the corrosion inhibiting layer forming second holes therebetween which are formed after the first holes are covered by the corrosion inhibiting layer; and
   a sliding layer formed on said corrosion inhibiting layer and made of a resin material, a part of the sliding layer being filled into the second holes,
   wherein the corrosion inhibiting layer is made of a material whose melting point is lower than that of the resin material of the sliding layer,
   wherein the first metal material of said base material is at least one of stainless steel made of iron and chromium, stainless steel made of iron, chromium, and nickel, and stainless steel made of iron, chromium, nickel, molybdenum, manganese, silicon, niobium, and titanium, wherein the second metal material of said intermediate layer is at least one of stainless steel made of iron and chromium, stainless steel made of iron, chromium, and nickel, and stainless steel made of iron, chromium, nickel, molybdenum, manganese, silicon, niobium, and titanium, wherein the resin material constituting said sliding layer contains a tetrafluoroethylene resin, wherein said sliding layer contains a filler made of a fiber and a particle which includes at least one of carbon and graphite, wherein said sliding layer contains an additional filler made of a whisker, fiber, and a particle, the whisker, the fiber, and the particle being made of at least one of potassium titanate, aluminum borate, and zinc oxide.

* * * * *